US012801814B2

(12) United States Patent
Yamaoka

(10) Patent No.: US 12,801,814 B2
(45) Date of Patent: Nov. 17, 2026

(54) PARAMETER DETERMINATION DEVICE, PARAMETER DETERMINATION METHOD, AND PARAMETER DETERMINATION PROGRAM FOR EPITAXIAL GROWTH SYSTEM

(71) Applicant: Epicrew Corporation, Ohmura (JP)

(72) Inventor: Tomonori Yamaoka, Ohmura (JP)

(73) Assignee: Epicrew Corporation, Nagasaki (JP)

( * ) Notice: Subject to any disclaimer, the term of this patent is extended or adjusted under 35 U.S.C. 154(b) by 910 days.

(21) Appl. No.: 18/124,622

(22) Filed: Mar. 22, 2023

(65) Prior Publication Data

US 2023/0351080 A1 Nov. 2, 2023

(30) Foreign Application Priority Data

Apr. 28, 2022 (JP) ................................ 2022-075038

(51) Int. Cl.
*G06F 30/28* (2020.01)
*G06F 111/10* (2020.01)

(52) U.S. Cl.
CPC .......... *G06F 30/28* (2020.01); *G06F 2111/10* (2020.01)

(58) Field of Classification Search
CPC ...... G06F 30/28; G06F 2111/10; G06F 30/20; C23C 16/24; C23C 16/4584; C23C 16/46;
(Continued)

(56) References Cited

U.S. PATENT DOCUMENTS 10,443,129 B2 10/2019 Mori et al.
2007/0010033 A1* 1/2007 Aderhold ............... C30B 23/02 257/E21.09
(Continued)

FOREIGN PATENT DOCUMENTS

JP 2010-114331 5/2010
JP 2010-258169 11/2010
(Continued)

OTHER PUBLICATIONS

Extended European Search Report dated Aug. 25, 2023, of counterpart European Patent Application No. 23164512.8.
(Continued)

*Primary Examiner* — Rehana Perveen
*Assistant Examiner* — Troy A Maust
(74) *Attorney, Agent, or Firm* — DLA Piper LLP (US)

(57) ABSTRACT

A parameter determination device, a parameter determination method, and a parameter determination program for computing selected values of one or more parameters for an epitaxial growth system in a short time and at low costs are provided. The device includes an input unit that accepts a plurality of values for each of one or more parameters, position data of an epitaxial film, and characteristic data measured by a characteristic measurement device for a deposited epitaxial film; and a computation unit that computes a selected value of each of the one or more parameters from the position data, the characteristic data, and the values
(Continued)

for each of the one or more parameters. The computation unit derives the response function $F_{Qj}(x, \Delta P_k)$ to compute the selected value of the one or more parameters by simulation.

11 Claims, 11 Drawing Sheets

(58) Field of Classification Search
CPC ......... C23C 16/52; C30B 25/16; C30B 29/06; G05B 13/042
See application file for complete search history.

(56) References Cited

U.S. PATENT DOCUMENTS

| | | | | |
|---|---|---|---|---|
| 2010/0272892 | A1 | 10/2010 | Kobayashi et al. | |
| 2012/0116545 | A1 * | 5/2012 | Yasui | G05B 13/042 700/29 |
| 2020/0392617 | A1 | 12/2020 | Faucillon et al. | |
| 2022/0020618 | A1 | 1/2022 | Takenaga et al. | |
| 2022/0406599 | A1 * | 12/2022 | Wada | H10P 72/0436 |
| 2023/0265580 | A1 | 8/2023 | Okabe | |

FOREIGN PATENT DOCUMENTS

| | | | |
|---|---|---|---|
| JP | 4868522 | B2 | 11/2011 |
| JP | 5343162 | B1 | 8/2013 |
| JP | 2017-059658 | | 3/2017 |
| JP | 6477381 | B2 | 2/2019 |
| JP | 2022-17910 | | 1/2022 |
| JP | 2022-63778 | | 4/2022 |
| TW | 200802542 | A | 1/2008 |
| WO | 2015/165300 | A1 | 11/2015 |

OTHER PUBLICATIONS

A.E. Gower-Hall et al., "Model-Based Uniformity Control for Epitaxial Silicon Deposition," IEEE Transactions of Semiconductor Manufacturing, vol. 15, No. 3, pp. 295-309, Aug. 2002.
Office Action mailed Dec. 30, 2025, from counterpart Taiwan Application No. 112108572.
Office Action dated Sep. 10, 2024, of counterpart Japanese Patent Application No. 2022-075038 along with an English translation.

* cited by examiner

PARAMETER DETERMINATION DEVICE, PARAMETER DETERMINATION METHOD, AND PARAMETER DETERMINATION PROGRAM FOR EPITAXIAL GROWTH SYSTEM

TECHNICAL FIELD

This disclosure relates to a parameter determination device, parameter determination method, and parameter determination program for epitaxial growth system.

BACKGROUND

In the epitaxial growth process as one of the semiconductor wafer processing processes to deposit an epitaxial film on a substrate, as shown in FIG. 1, a substrate is placed on a susceptor 13 provided in a chamber 10 of an epitaxial growth system, reaction gas is introduced into the chamber 10 and heated to form an epitaxial film on the substrate (refer to, for example, Japanese Registered Patent No. 5343162 and Japanese Registered Patent No. 6477381).

One of the indicators to evaluate the quality of semiconductor wafers is the thickness distribution of the epitaxial film in the epitaxial growth process. To ensure the stable quality of the semiconductor wafers, the thickness distribution of the epitaxial film needs to be as even as possible.

In the epitaxial growth process, the film thickness distribution with respect to the wafer radius varies depending on the values of a plurality of process parameters such as gas flow rate of carrier gas and silicon source gas, for example, wafer temperature, lamp heating balance, gas flow rate balance, susceptor rotation speed, and height of the wafer support table. When depositing epitaxial films, each of the multiple process parameters is adjusted to the selected value so that the amount of variation in the film thickness distribution is within a predetermined range.

The values of a plurality of process parameters have been adjusted on the basis of experience conventionally. Specifically, the values of the process parameters have been predicted to maintain the amount of variation of the film thickness within a predetermined range, test deposition has been performed using the predicted values of the process parameters, the film thickness distribution has been measured, and the process parameters have been finely adjusted on the basis of the results. The adjustment of the process parameter values on the basis of experience has been time-consuming and costly since the adjustment has been made at every time point such as when maintenance has been performed on the epitaxial growth system, when the distribution has changed due to subtle changes in the environment or system, and when a changeover has been made in the manufactured product, i.e., when the target quality has been changed.

In contrast, a method of determining a plurality of process parameters in the epitaxial growth process is disclosed in JP6477381. According to that method, an influence coefficient, which is the amount of variation of the film thickness for each portion of the target wafer when a plurality of process parameters are manipulated by a unit amount, is used to compute the predicted value of the film thickness distribution index, and the influence coefficient can be obtained by performing multiple regression analysis to minimize the film thickness deviation for each portion of the target wafer on the basis of past film thickness adjustment results.

The method disclosed in JP6477381 requires a large number of film thickness adjustment results, and the computation of the influence coefficient is time-consuming. The large amount of data acquired over a long period of time will include data from slightly different environments and system conditions as well as data from system conditions that have changed over the course of maintenance. Since the state of the data at the time of analysis is different from the state of the data at the time of data acquisition, the analysis using these data will have a large error margin. Therefore, it is not practical to employ this method in deriving selected values for a plurality of process parameters for each maintenance of epitaxial growth system in a large-scale production line, for example.

It could therefore be helpful to provide a parameter determination device, a parameter determination method, and a parameter determination program that derive selected values of parameters for an epitaxial growth system in a short period of time and at low costs.

SUMMARY

I thus provide a parameter determination device for computing an appropriate value for each of one or more parameters for an epitaxial growth system for depositing an epitaxial film on a substrate. The parameter determination device includes: an input unit that accepts a plurality of values for each of the one or more parameters, position data of the epitaxial film, and characteristic data measured by a characteristic measurement device for the epitaxial film deposited by the epitaxial growth system using the one or more parameters; and a computation unit that computes an appropriate value for each of the one or more parameters from the position data, the characteristic data, and the values for each of the one or more parameters for depositing the epitaxial film. The computation unit has equation (1) for a characteristic $Q_j$, where $Q_j$ is the characteristic data, x is the position, $P_i$ is the one or more process parameters, and M is a total number of the one or more parameters, and $1 \leq i \leq M$:

$$Q_j(x, P_1, \ldots, P_M) = \sum_{i=1}^{M} f_{Q_j,i}(x, P_i) \tag{1}$$

when the parameter $P_k$ at i=k is varied by $\Delta P_k$, and of the one or more parameters $P_1, \ldots, P_M$, the parameter $P_i$ at $i \neq k$ is not varied, an amount of variation $\Delta Q_{j,k}$ of the characteristic $Q_j$ is expressed by equation (2):

$$\begin{aligned}\Delta Q_j(x, \Delta P_k) = \\ Q_j(x, P_1, \ldots, P_k + \Delta P_k, \ldots, P_M) - Q_j(x, P_1, \ldots, P_M) = \\ \sum_{i=1, i\neq k}^{M} f_{Q_j,i}(x, P_i) + f_{Q_j,k}(x, P_k + \Delta P_k) - \sum_{i=1}^{M} f_{Q_j,i}(x, P_i) = \\ f_{Q_j,k}(x, P_k + \Delta P_k) - f_{Q_j,k}(x, P_k) = F_{Q_j}(x, \Delta P_k).\end{aligned} \tag{2}$$

The response function $F_{Qj}(x, \Delta P_k)$ is derived from the equations above, and the derived response function $F_{Qj}(x, \Delta P_k)$ is used to compute by simulation an selected value of the one or more parameters, which minimizes a deviation from a desired constant or desired function of the characteristic within a predetermined range of the position.

The response function may be a linear function.

The characteristic may be one of the following: film thickness, growth rate, specific resistance value, flatness, edge flatness, backside deposition thickness, roughness, and Haze of the epitaxial film.

The parameter may be a process parameter and be at least one of the following: gas flow rate of carrier gas or silicon source gas, wafer temperature, lamp heating balance, gas flow rate balance, susceptor rotation speed, and susceptor height.

The position may be one of the following: distance from a center point of the substrate, distance from an edge of a disk-shaped substrate, circumferential angle of the disk-shaped substrate, or a combination thereof.

The parameter may be a hardware design parameter, which may be a height of a pocket in a susceptor design and a distance between a pocket wall and a wafer edge, and the characteristic may be a film thickness at the wafer edge.

The parameter may be a hardware design parameter, which may be a height of space where a gas flow is formed in the epitaxial growth system, and the characteristic may be a thickness of the epitaxial film.

The parameter may be a hardware design parameter, which may be a slope of a reflector for a heating lamp, and the characteristic may be a thickness of the epitaxial film.

The parameter determination device may further include: a growth system controller that transmits a plurality of values for each of the one or more parameters to the epitaxial growth system; a characteristic measurement device controller that transmits the position data of the epitaxial film for measuring the characteristic to the characteristic measurement device and receives the characteristic data of the epitaxial film from the characteristic measurement device; and a characteristic distribution determination unit that determines whether the characteristic data deviates from within a predetermined range. If the characteristic data deviates from within the predetermined range, an appropriate value of each of the one or more parameters may be computed again.

I also provide a parameter determination method of computing an appropriate value for each of one or more parameters for an epitaxial growth system for depositing an epitaxial film on a substrate. The method includes the steps of: accepting a plurality of values for each of the one or more parameters, position data of the epitaxial film, and characteristic data measured by a characteristic measurement device for the epitaxial film deposited by the epitaxial growth system using the one or more parameters; deriving a response function $F_{Qj}(x, \Delta P_k)$ from following equations. If characteristic data obtained by measuring the characteristic is $Q_j$, the position is x, the one or more parameters is $P_i$, and a total number of the one or more parameters is M, and $1 \leq i \leq M$, the characteristic $Q_j$ is expressed by equation (3):

$$Q_j(x, P_1, \dots, P_M) = \sum_{i=1}^{M} f_{Q_j,i}(x, P_i). \tag{3}$$

When the parameter $P_k$ at i=k is varied by $\Delta P_k$, and of the one or more parameters $P_1, \dots, P_M$, the parameter $P_i$ at i≠k is not varied, an amount of variation $\Delta Q_j$, k of the characteristic $Q_j$ is expressed by equation (4):

$$\begin{aligned}\Delta Q_j(x, \Delta P_k) &= Q_j(x, P_1, \dots, P_k + \Delta P_k, \dots, P_M) - Q_j(x, P_1, \dots, P_M) \\ &= \sum_{i=1, i\neq k}^{M} f_{Q_j,i}(x, P_i) + f_{Q_j,k}(x, P_k + \Delta P_k) - \sum_{i=1}^{M} f_{Q_j,i}(x, P_i) \\ &= f_{Q_j,k}(x, P_k + \Delta P_k) - f_{Q_j,k}(x, P_k) = F_{Q_j}(x, \Delta P_k).\end{aligned} \tag{4}$$

The method further includes the step of computing by simulation an selected value of the one or more parameters, which minimizes a deviation from a desired constant or desired function of the characteristic within a predetermined range of the position using the derived response function $F_{Qj}(x, \Delta P_k)$.

I further provide a parameter determination program for computing an appropriate value for each of one or more parameters for an epitaxial growth system for depositing an epitaxial film on a substrate. The program causes a computer to embody: an input function that accepts a plurality of values for each of the one or more parameters, position data of the epitaxial film, and characteristic data measured by a characteristic measurement device for the epitaxial film deposited by the epitaxial growth system using one or more parameters; and a response function creation function that derives response function $F_{Qj}(x, \Delta P_k)$ from following equations, wherein if the characteristic data obtained by measuring the characteristic is $Q_j$, a position is x, the one or more parameters is $P_i$, and a total number of the one or more parameters is M, and $1 \leq i \leq M$, the characteristic $Q_j$ is expressed by equation (5):

$$Q_j(x, P_1, \dots, P_M) = \sum_{i=1}^{M} f_{Q_j,i}(x, P_i). \tag{5}$$

When the parameter $P_k$ at i=k is varied by $\Delta P_k$, and of the one or more parameters $P_1, \dots, P_M$, the parameter $P_i$ at i≠k is not varied, an amount of variation $\Delta Q_j$, k of the characteristic $Q_j$ is expressed by equation (6):

$$\begin{aligned}\Delta Q_j(x, \Delta P_k) &= Q_j(x, P_1, \dots, P_k + \Delta P_k, \dots, P_M) - Q_j(x, P_1, \dots, P_M) \\ &= \sum_{i=1, i\neq k}^{M} f_{Q_j,i}(x, P_i) + f_{Q_j,k}(x, P_k + \Delta P_k) - \sum_{i=1}^{M} f_{Q_j,i}(x, P_i) \\ &= f_{Q_j,k}(x, P_k + \Delta P_k) - f_{Q_j,k}(x, P_k) = F_{Q_j}(x, \Delta P_k).\end{aligned} \tag{6}$$

The computer is further caused to execute a selected value computation function that computes by simulation a selected value of the one or more parameters, which minimizes a deviation from a desired constant or desired function of the characteristic within a predetermined range of the position using the derived response function $F_{Qj}(x, \Delta P_k)$.

I thus provide a parameter determination device, a parameter determination method, and a parameter determination program that derive selected values of parameters for an epitaxial growth system in a short period of time and at low costs.

BRIEF DESCRIPTION OF THE DRAWINGS

Features, advantages, and technical and industrial significance of examples of the disclosure will be described below with reference to the accompanying drawings, in which like numerals denote like elements.

FIG. 6A is a graph for process parameters $P_1$, FIG. 6B is a graph for process parameters $P_2$, and FIG. 6C is a graph for process parameters $P_3$.

DESCRIPTION OF THE REFERENCE NUMERALS

Figure 1:
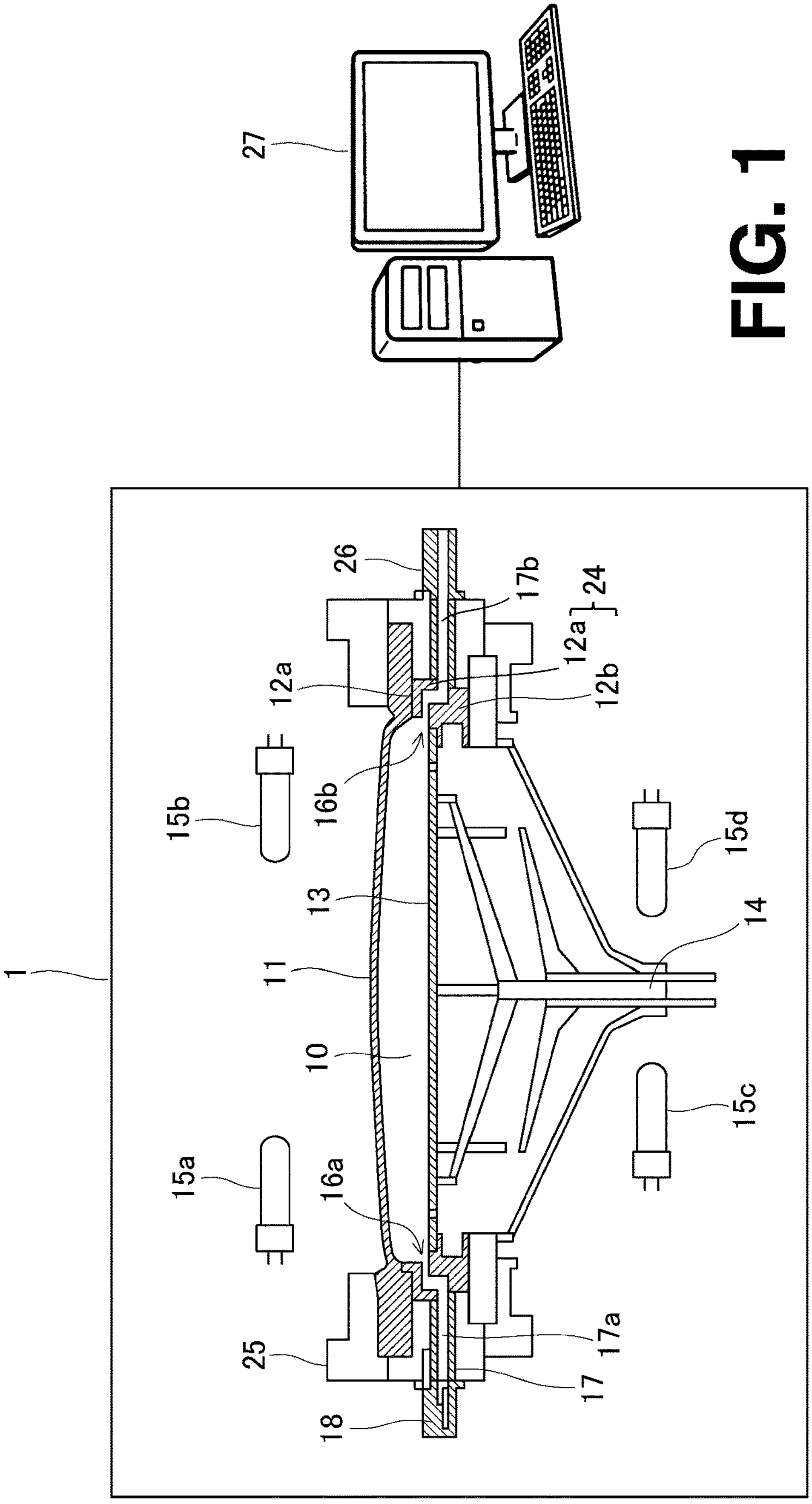
FIG. 1 is a schematic diagram illustrating an example of a parameter determination device according to a first example.

1 Epitaxial Growth System
10 Chamber
11 Ceiling
12*a* Upper Side Wall
12*b* Lower Side Wall
9 Susceptor
14 Susceptor Support
15*a* to 15*d* Heating Unit
16*a* Gas Inlet Port
16*b* Gas Outlet Port
17*a* Supply Path
17*b* Discharge Path
21 Gas Inlet Path
22, 23 Reaction Gas
24 Side Wall
25 Clamper
21 Gas Outlet Path
27 Control Device
301 CPU
302 ROM
303 RAM
115 Storage
305 Input/Output (I/O) Interface
306 Growth System Controller
308 Computation Unit
309 Input Unit
310 Output Unit
1000 Control Device
1001 Characteristic Distribution Determination Unit
1002 Film Thickness Device Controller

DETAILED DESCRIPTION

Next, an example will be described with reference to the drawings. In the description of the drawings according to the example, the same or similar reference numerals are assigned to the same or similar components. However, the drawings are schematic.

Also, the examples illustrate examples of devices and methods embodying the technical concept of the disclosure, and the technical concept of the disclosure does not specify the configuration, arrangement, or layout of the components to the following, for example. The technical concept of this disclosure may be modified in various ways within the technical scope defined by the appended claims.

First Example

A parameter determination device according to a first example will be described below. FIG. 1 illustrates an example of the parameter determination device. The parameter determination device shown in FIG. 1 includes an epitaxial growth system 1, a computation device 27, and a film thickness measurement device (not shown).

The epitaxial growth system 1 shown in FIG. 1 corresponds to a device for epitaxially growing silicon and other films on a substrate. The film thickness measurement device is used to measure the thickness of the epitaxial films grown by the epitaxial growth system 1. The computation device 27 corresponds to a device for computing selected values of parameters to adjust the amount of variation in the thickness distribution of the epitaxial films to be within a predetermined range on the basis of the parameters used in growing the epitaxial films by the epitaxial growth system 1 and the thickness values of the epitaxial films measured by the film thickness measurement device.

Figure 2:
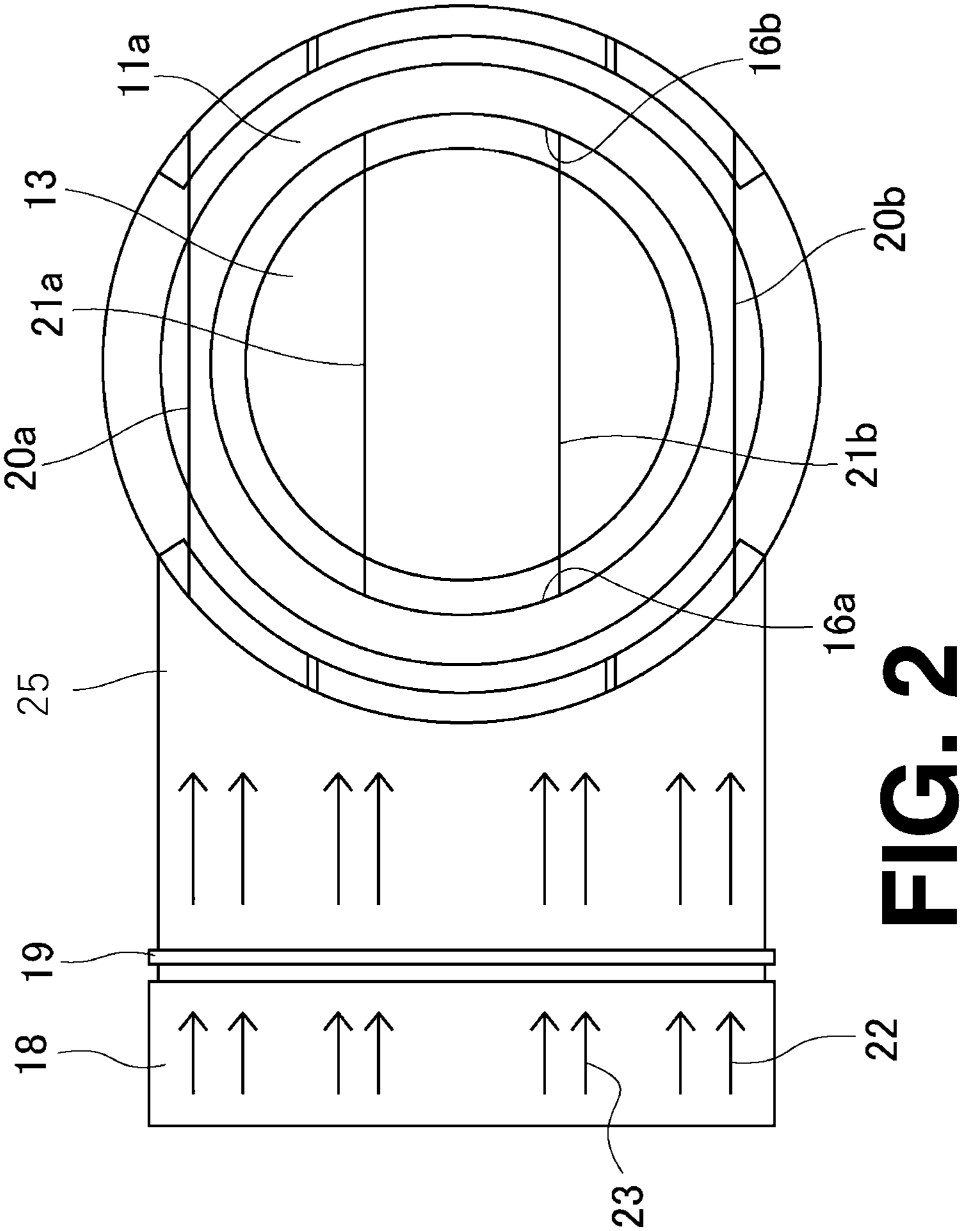
FIG. 2 is a top view illustrating an epitaxial growth system shown in FIG. 1.

The left side of FIG. 1 shows a longitudinal cross-sectional view of the epitaxial growth system 1. FIG. 2 shows a top view of the epitaxial growth system 1 shown in FIG. 1. The epitaxial growth system 1 shown in FIGS. 1 and 2 includes a susceptor 13, a side wall 24, and a ceiling 11.

A chamber 10 is configured by the susceptor 13, side wall 24, and ceiling 11. The ceiling 11 is made of permeable material such as quartz. The susceptor 13 is disk-shaped and is provided such that the disk-shaped surface is horizontal. A substrate is placed inside the chamber 10 and on the susceptor 13.

The susceptor 13 is supported by a susceptor support 14 located below the susceptor 13. The susceptor support 14 has a cylindrical shape and is arranged such that the center of the disk-shaped susceptor 13 and the axis of the susceptor support 14 are aligned with each other. The susceptor support 14 includes a rotation mechanism that rotates about an axis thereof, and this rotation mechanism allows the susceptor 13 to rotate. In addition, the susceptor support 14 may be configured to be vertically movable such that the height of the susceptor 13 can be adjusted within the chamber 10.

The heating means 15*a* to 15*d* are provided above and below the chamber 10 to heat the chamber 10. The heating means 15*a* to 15*d* correspond to, for example, halogen lamps, but any means may be used if the chamber 10 can be heated, and are not limited to be halogen lamps.

The side wall 24 is configured by an upper side wall 12*a* and a lower side wall 12*b*. The upper side wall 12*a* and the lower side wall 12*b* are annular and each has a notch in one portion thereof. These notches form a gas inlet port 16*a* and a gas outlet port 16*b*. The gas inlet port 16*a* and the gas outlet port 16*b* are provided opposite to each other with respect to the chamber 10. The reaction gas for epitaxial growth of silicon and other films on the substrate flows through the gas inlet port 16*a* into chamber 10, flows parallel to the substrate surface over the substrate, and is discharged from the chamber 10 through the gas outlet port 16*b*.

The outer circumference of the susceptor 13, the side wall 24, and the ceiling 11 include an annular damper 25. The damper 25 includes a supply path 17*a* in communication with the gas inlet port 16*a* and a discharge path 17*b* in communication with the gas outlet port 16*b*.

A gas inlet path 18 is connected to the supply path 17*a*, and the reaction gases 22 and 23 are distributed from the gas inlet path 18 through the supply path 17*a* and the gas inlet port 16*a* to the chamber 10. In the same manner, a gas discharge path 26 is connected to the discharge path 17*b*, and the reaction gases 22 and 23 distributed to the chamber 10 are discharged through the gas outlet port 16*b*, discharge path 17*b*, and gas discharge path 26.

A gas supply source, not shown, is connected to the gas inlet path 18. The reaction gas supplied from the supply source corresponds to a mixture of one or more source gases such as trichlorosilane and phosphine, and a carrier gas such as hydrogen. Between the gas inlet path 18 and the gas supply source, gas valves are provided to adjust the gas flow rates of one or more source gases and the carrier gas, respectively.

When epitaxial films are grown by the epitaxial growth system shown in FIGS. 1 and 2, a substrate is placed on the susceptor 13, the reaction gas is introduced from the gas inlet path 18 to the chamber 10, and then the temperature of the substrate is set to a predetermined temperature by heating means 15*a* to 15*d*. Regarding the installation of the substrate on the susceptor 13, it may be installed and retrieved on the susceptor 13, as an example, from the rear side in FIG. 1 and the top side in FIG. 2, by a robot arm or other means.

When the epitaxial film is grown, the susceptor 13 is rotated at a constant speed. Accordingly, as for the thickness distribution of the epitaxial film, the thicknesses at an equal distance from the central point of the substrate can be the same with each other, that is, the thickness distribution of the epitaxial film corresponds to the film thickness at a distance from the central point of the substrate if eccentricity in rotation and a shift of the substrate from the central position in the susceptor are negligible.

The process parameters to adjust the amount of variation in the thickness distribution of the epitaxial film to be within a predetermined range correspond to parameters that may effect epitaxial growth such as the corresponding gas flow rates and gas flow balances of one or more source and carrier gases, the substrate temperature, the corresponding heating balances of the heating means 15*a* to 15*d*, the rotation speed of the susceptor 13, and the height of the susceptor 13 in the chamber 10.

In this example, the epitaxial growth system 1 is configured to be connected to and controlled by the computation device 27. The computation device 27 is configured by various electronic computers (computing resources) such as personal computers (PCs), mainframes, workstations, and cloud computing systems. The computation device 27 shown in FIG. 1 corresponds to a personal computer to which a display that displays the computation results, a printer, as well as a keyboard and mouse for inputs are connected, for example.

Although the epitaxial growth system 1 is assumed to be the device shown in FIGS. 1 and 2 in this example, it is not limited to the device shown in FIGS. 1 and 2 if it corresponds to a device for growing epitaxial films. In this example, it is assumed that the epitaxial growth system 1 is connected to and controlled by the computation device 27, but the epitaxial growth system 1 need not be connected to or controlled by the computation device 27.

The film thickness measurement device can be any device capable of measuring the film thickness at a desired location on the epitaxial film in any method such as an optical film thickness measurement method. In this example, the film thickness measurement device measures the thickness of the deposited epitaxial film. The film thickness measurement device measures the wafer after the epitaxial film is deposited, not during the deposition process. In this example, the film thickness measurement device is not connected to the computation device 27. After the epitaxial film is deposited in the epitaxial growth system 1, the deposited wafer is removed from the epitaxial growth system 1 and the film thickness is measured in the film thickness measurement device, but the configuration is not limited to this. For example, as described below in the second example, the film thickness measurement device may be connected to the computation device 27, and configured to be controlled by the computation device 27, for example, in removal of the wafer after deposition from the epitaxial growth system 1 and film thickness measurement in the film thickness measurement device.

Figure 3:
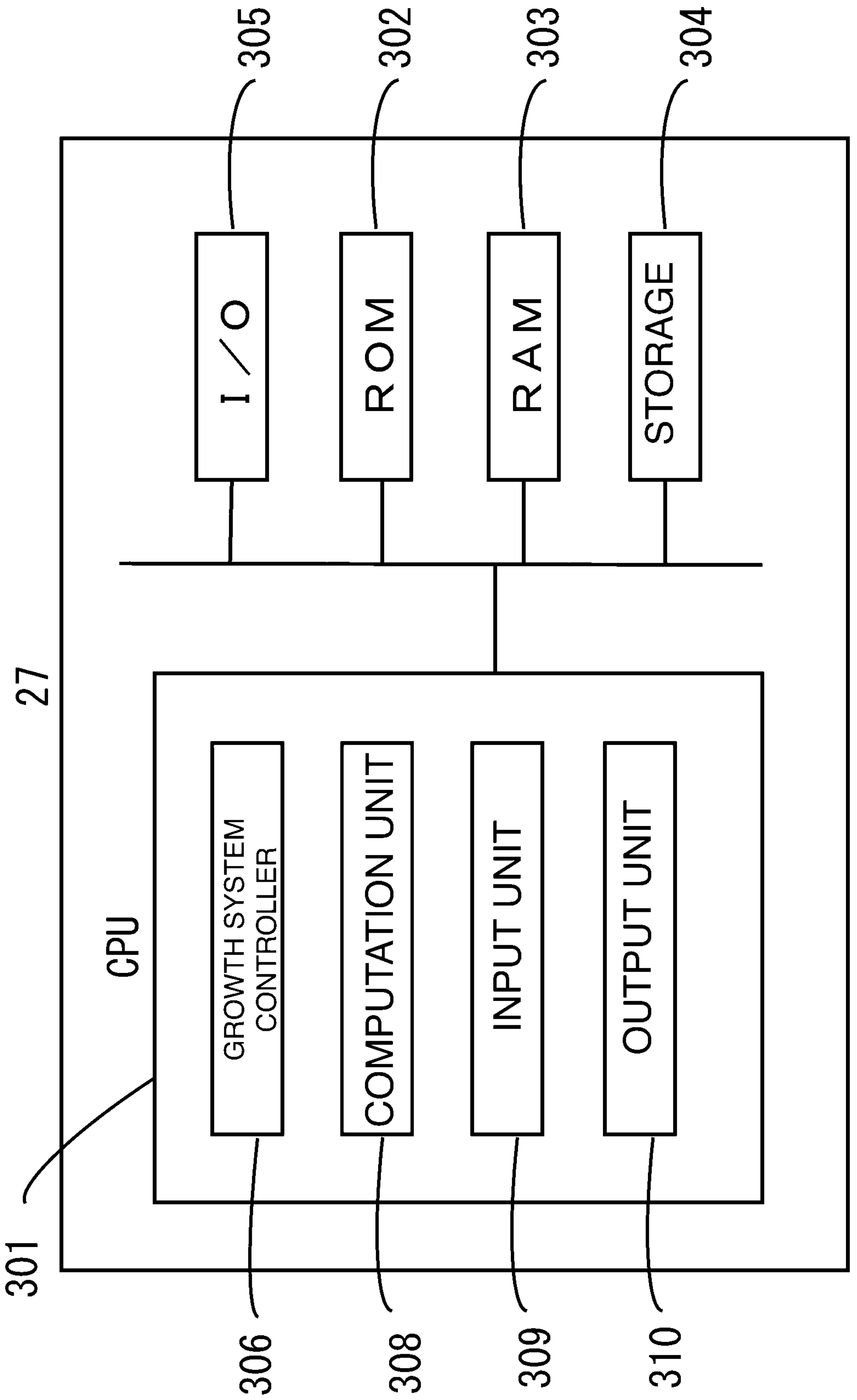
FIG. 3 is a block diagram illustrating a configuration of a control device of the parameter determination device according to the first example.

FIG. 3 is a block diagram illustrating a configuration of the computation device 27. The computation device 27 may include a CPU 301 for executing various computations, a ROM 302 for storing programs for processing, a RAM 303 for storing data, for example, a storage 304 for storing various data and computation results, and an input-output (I/O) interface 305. The I/O 305 corresponds to, for example, an interface and/or buffer for communication (transmitting/receiving). The I/O 305 is used to transmit control signals to the epitaxial growth system 1 and is linked to the CPU 301.

Further, the block diagram in FIG. 3 illustrates the functional units within the CPU 301. When software embodies the functional units of the CPU 301, the CPU 301 executes the instructions of the program as the software that embodies the functions. In detail, the functional units may include, for example, a growth system controller 306, computation unit 308, input unit 309, and output unit 310.

The growth system controller 306 transmits signals to the epitaxial growth system 1 via the I/O 305 to control the epitaxial growth system 1 such as the initial values of one or more process parameters entered through the input unit 309, the selected values of process parameters computed by the computation unit 308 described below, the start of deposition, the end of deposition, and test fabrication conditions of epitaxial films.

The computation unit 308 computes the response function and the selected values of process parameters using the values of process parameters, film thickness values obtained by measurement by the film thickness measurement device, and data of positions on the substrate corresponding to the film thickness values among the conditions for growing epitaxial films by the epitaxial growth system 1.

The input unit 309 accepts the growth conditions of the epitaxial films by the epitaxial growth system 1, the film thickness values obtained by the measurement by the film thickness measurement device, and the data of the positions on the substrate corresponding to the film thickness values, for example, entered through the input keyboard and mouse connected to the computation device 27. The conditions for film thickness measurement by the film thickness measurement device are, for example, the position, and measurement range, at which the thickness of the epitaxial film on the substrate is measured.

The output unit 310 supplies the response function computed by the computation unit 308 and the selected values of the process parameters to a display and printer, for example, connected to the computation device 27.

In this example, the epitaxial growth system 1 is connected to and controlled by the computation device 27, but if the epitaxial growth system 1 is not connected to the computation device 27, the computation device 27 need not include the growth system controller 306. In this example, the values of process parameters among the conditions for growing the epitaxial films by the epitaxial growth system 1 accepted in the input unit 309 are used for the response function and the computation of the selected values of the process parameters in the computation unit 308. The growth conditions for epitaxial growth by the epitaxial growth system 1 are directly entered to the epitaxial growth system 1.

The parameter determination device shown in FIG. 1 corresponds to a device that computes the selected values of the process parameters for the deposition of the epitaxial films by the epitaxial growth system 1 and enters the computed selected values of the process parameters to the epitaxial growth system 1.

The operation of the parameter determination device shown in FIG. 1 is as follows. First, after the substrate is introduced into the epitaxial growth system 1, the values of process parameters and other conditions for the deposition of epitaxial films are entered through the input unit 309.

First, N process parameters Pn out of R process parameters are selected as the values of process parameters for depositing the epitaxial films (1≤n≤N). R corresponds to the number of all the process parameters needed to deposit the epitaxial films by the epitaxial growth system 1, and N corresponds to an integer satisfying 1≤N≤R. The N process parameters correspond to the process parameters of which appropriate values are computed by the parameter determination device. The remaining process parameters excluding the N process parameters Pn among all the process parameters are fixed values and are hereinafter referred to as fixed process parameters. Which of all the process parameters is to be used as the process parameter Pn for which the selected value is to be computed is selected each time.

In this example, deposition is performed for each of the N process parameters Pn, changing the value by Sn (Sn is directed to an integer greater than or equal to 2). Sn is directed to the number of values of the process parameter Pn. For example, if Sn=2, two values of the process parameters Pn are determined, and the film is deposited using each of the two values. In this example, two epitaxial films are deposited.

When the value for one of the N process parameters Pn is changed by Sn, the values of the remaining (N−1) process parameters are not changed. The number T of epitaxial films to be deposited is then expressed by equation (7):

$$T = \sum_{n=1}^{N} Sn. \tag{7}$$

As described above, the values of process parameters for the deposition of epitaxial films and other conditions are: the type of process parameter for which the selected value is computed among all the process parameters, the value of each of the fixed process parameters, and the value of each of the Sn points for each of the N process parameters Pn. The entered process parameter values and other conditions are transmitted to the epitaxial growth system 1 by the growth system controller 306 via I/O 305, and the deposition begins in the epitaxial growth system 1.

After the deposition is performed, the position data of the epitaxial film to measure the characteristics is transmitted from the characteristic measurement device controller to the characteristic measurement device, which measures the characteristics, and the characteristics of the deposited epitaxial film are measured at each point on the epitaxial film by the characteristic measurement device. The position data is directed to positions on the test specimen at which the characteristic measurement device measures the characteristics. The positions on the test specimen correspond to a plurality of points on the centerline of the substrate in a substrate on which an epitaxial film has been deposited.

In this example, the characteristic is the film thickness, and the thickness of the epitaxial film is measured by a film thickness measurement device. The positions at which the film thickness is measured correspond to, for example, a plurality of points on the centerline of a circular substrate, and are determined by the position data transmitted from the characteristic measurement device controller. In this example, after the deposition is performed, the substrate with the epitaxial film deposited on the top surface thereof is removed from the epitaxial growth system 1, and then introduced into the film thickness measurement device. The positions at which the film thickness is measured are entered to the film thickness measurement device to start the measurement of the film thickness. The film thickness values obtained by the measurement by the film thickness measurement device and the data of the positions on the substrate corresponding to the film thickness values are entered to the computation device 27.

The growth system controller 306 transmits the values of the process parameters at this time to the computation unit 308. The computation unit 308 uses the values of the film thickness, position data, and values of the process parameters to compute the selected values for the process parameters by the following method. The growth system controller 306 transmits the computed selected values of process parameters to the epitaxial growth system 1, and the deposition of the epitaxial film begins.

The method of computing the selected values of the process parameters in this example will be described below. When the characteristic under test is set as $Q_j$, and the characteristic $Q_j$ is set as a function of the variables x and the process parameters $P_1, \ldots, P_M$, the characteristic $Q_j$ is represented by the function $f_{Qj,i}(x, P_i)$ in equation (1):

$$Q_j(x, P_1, \ldots, P_M) = \sum_{i=1}^{M} f_{Q_j,i}(x, P_i). \tag{1}$$

When j is set as the number of characteristics subject to R, 1≤j≤R, and when i is set as the number of process parameters subject to M, 1≤i≤M.

The selected values of the process parameters correspond to the values of the process parameters that set the characteristic $Q_j(x, P_1, \ldots, P_M)$ as a desired constant or desired function within a predetermined range of the variables x. x may be a continuous variable, or when N is set as a measurement number, x may be a discontinuous value such as an integer satisfying $1 \leq x \leq N$.

In the characteristic $Q_j$, it is impractical to find a perfectly consistent $f_{Qj,i}(x, P_i)$ for all the parameters. This is because it is difficult to identify all the parameters involved in the epitaxial growth, and even if all the parameters could be identified, it is significantly difficult to compute a function $f_{Qj,i}(x, P_i)$ that includes those parameters. Accordingly, it is practical to define and operate a response to each target parameter as a response function $F_{Qj}(x, \Delta P_k)$ from the response at a corresponding position when the target parameter is varied for each target characteristic value under certain conditions. In practice, when a plurality of parameters are varied, an interaction in the response of each of the varied parameters is observed, which causes the function to be complicated. Accordingly, it is preferable to cause the range of the variation range to be small enough so that the interaction can be negligible, and obtain a response function $F_{Qj}(x, \Delta P_k)$. The specific derivation method will be described as follows.

If the process parameter $P_k$ when i≠k is varied by $\Delta P_k$ and the process parameter $P_i$ among the process parameters $P_i, \ldots, P_M$ when i≠k is not varied, the variation $\Delta Q_{j,k}$ of the characteristic $Q_j$ is expressed by equation (2):

$$\begin{aligned} \Delta Q_j(x, \Delta P_k) &= Q_j(x, P_1, \ldots, P_k + \Delta P_k, \ldots, P_M) - Q_j(x, P_1, \ldots, P_M) \\ &= \sum_{i=1, i \neq k}^{M} f_{Q_j,i}(x, P_i) + f_{Q_j,k}(x, P_k + \Delta P_k) - \sum_{i=1}^{M} f_{Q_j,i}(x, P_i) \\ &= f_{Q_j,k}(x, P_k + \Delta P_k) - f_{Q_j,k}(x, P_k) = F_{Q_j}(x, \Delta P_k). \end{aligned} \tag{2}$$

By obtaining the variation $\Delta Q_{j,k}$ in the characteristic $Q_j$ at a time when the process parameter $P_k$ is varied by $\Delta P_k$ among the process parameters $P_1, \ldots, P_M$ at i=k by actual measurement, the response function $F_{Qj}(x, \Delta P_k)$ representing the difference of the function $f_{Qj,k}(x, P_k)$ can be derived. The response function $F_{Qj}(x, \Delta P_k)$ for all the process parameters $P_1, \ldots, P_M$ is derived in the same manner. The process parameter $P_k$ is varied at a plurality of levels, for example, by the variation $\Delta P_k$ being varied by $2 \times \Delta P_k$ and $3 \times \Delta P_k$, for example, to obtain the variation $\Delta Q_{j,k}$ of the characteristic $Q_j$ so that a more accurate response function $F_{Qj}(x, \Delta P_k)$ can be derived.

The response function $F_{Qj}(x, \Delta P_k)$ may be, for example, a polynomial or exponential function, but in practice, if $\Delta P_k$ is sufficiently small, it can be expressed as in equation (7):

$$F_{Q_j}(x, \Delta P_k) = A_{j,k}(x) \cdot \Delta P_k. \tag{7}$$

By deriving the coefficients $A_{j,k}(x)$, the response function $F_{Qj}(x, \Delta P_k)$ can be derived.

Using the derived response function $F_{Qj}(x, \Delta P_k)$, the process parameters $P_1, \ldots, P_M$ that minimize the deviation from the desired constant or desired function of the characteristic $Q_j(x, P_1, \ldots, P_M)$, i.e., the desired distribution depending on the position of the characteristic within a predetermined range of variables x are then computed by simulation using the gradient method, for example. The computed process parameters $P_1, \ldots, P_M$ correspond to the selected values of the process parameter.

If the target test object is directed to an epitaxial film, the characteristic $Q_j(x, P_1, \ldots, P_M)$ may correspond to, for example, film thickness, growth rate, specific resistance value, flatness, edge flatness, back depot thickness, roughness, and Haze, for example. The variable x is directed to a distance from the central point of the substrate, a distance from the edge of the disk-shaped substrate, a circumferential angle of the disk-shaped substrate, or a combination of these. The process parameters $P_1, \ldots, P_M$ may be directed to gas flow rate of carrier gas and silicon source gas, for example, wafer temperature, lamp heating balance, gas flow rate balance, susceptor rotation speed, and susceptor height.

In the above description, the response function $F_{Qj}(x, \Delta P_k)$ is described for the example i=k. When a plurality of parameters are varied, however, as described below, the total sum of response functions $F_{Qj}(x, \Delta P_k)$ can be approximated to the amount of variation in the characteristics to allow simulation. In this example, the characteristic $Q_j(x, P_1, \ldots, P_M)$ is set as the film thickness distribution $t(x, P_1, \ldots, P_M)$ and the variable x is set as a distance from the central point of the substrate where if the radius of the substrate is set as r, then $-r \leq x \leq r$. The film thickness $t(x, P_1, P_2, P_3)$ at a time when the process parameters correspond to $P_1, P_2, P_3$ is expressed by equation (8):

$$t(x, P_1, P_2, P_3) = f_{t,1}(x, P_1) + f_{t,2}(x, P_2) + f_{t,3}(x, P_3). \tag{8}$$

The film thickness variation $\Delta t(x, \Delta P_k)$ at a time when one of the process parameters $P_1, P_2, P_3$ is varied by $\Delta P_k$ is expressed by equation (9) (where k=1, 2, 3):

$$\begin{aligned} \Delta t(x, \Delta P_1) &= t(x, P_1 + \Delta P_1, P_2, P_3) - t(x, P_1, P_2, P_3) \\ &= \{f_{t,1}(x, P_1 + \Delta P_1) - f_{t,1}(x, P_1)\} = F_{t,1}(x, \Delta P_1) \\ \Delta t(x, \Delta P_2) &= t(x, P_1, P_2 + \Delta P_2, P_3) - t(x, P_1, P_2, P_3) \\ &= \{f_{t,2}(x, P_2 + \Delta P_2) - f_{t,2}(x, P_2)\} = F_{t,2}(x, \Delta P_2) \\ \Delta t(x, \Delta P_3) &= t(x, P_1, P_2, P_3 + \Delta P_3) - t(x, P_1, P_2, P_3) \\ &= \{f_{t,3}(x, P_3 + \Delta P_3) - f_{t,3}(x, P_3)\} = F_{t,3}(x, \Delta P_3). \end{aligned} \tag{9}$$

If the interaction of each parameter is negligible, $\Delta t(x, P_1+\Delta P_1, P_2+\Delta P_2, P_3+\Delta P_3)$ at a time when $\Delta P_1, \Delta P_2, \Delta P_3$ are simultaneously varied can be expressed as follows:

$$\Delta t(x, P_1 + \Delta P_1, P_2 + \Delta P_2, P_3 + \Delta P_3) = F_{t,1}(x, \Delta P_1) + F_{t,2}(x, \Delta P_2) + F_{t,3}(x, \Delta P_3).$$

When $\Delta P_1, \Delta P_2, \Delta P_3$ are determined such that the amount of variation of film thickness $t(x, P_1, P_2, P_3)$ at $-r \leq x \leq r$ is minimized, the selected values of the process parameters can be obtained.

First Experimental Example

Using the parameter determination method according to an example, the response function for the epitaxial deposition process was actually computed. The details thereof will be described below.

Actual epitaxial deposition was performed using the epitaxial growth system shown in FIGS. 1 and 2. In this process, the growth temperature was changed at three levels: 1030° C., 1080° C., and 1130° C. to perform the epitaxial deposition. In this example, since three patterns of growth temperatures are provided, if one epitaxial film is deposited per pattern, the number of epitaxial films obtained is three. It is acceptable to deposit a plurality of epitaxial films per pattern and take the average of the characteristic values.

Figure 4:
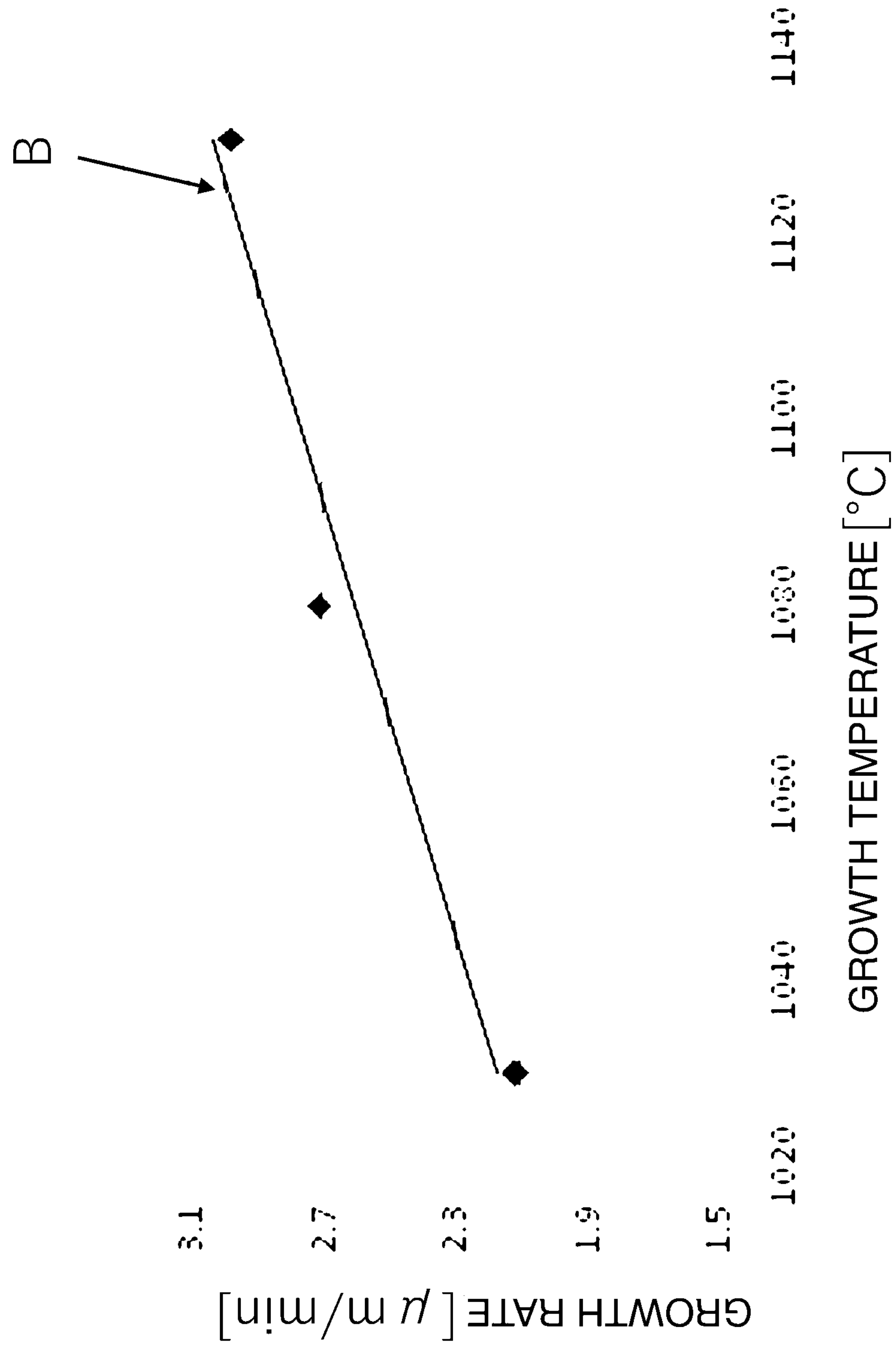
FIG. 4 is a graph illustrating temperature dependency of a deposition rate of an epitaxial film deposited using the epitaxial deposition system shown in FIGS. 1 and 2.

The film thickness was measured at a plurality of points on the centerline of the circular substrate of the resulting epitaxial film, and the growth rate was determined from the film thickness and growth time. FIG. 4 shows the growth temperature dependency of the growth rate at one point on the centerline of the circular substrate. Line B in FIG. 4 corresponds to a straight line fitted to the data by the least-squares method. The linearity of the growth temperature dependency of the growth rate was confirmed at all the locations where the growth rate was measured on the centerline of the circular substrate.

Figure 5:
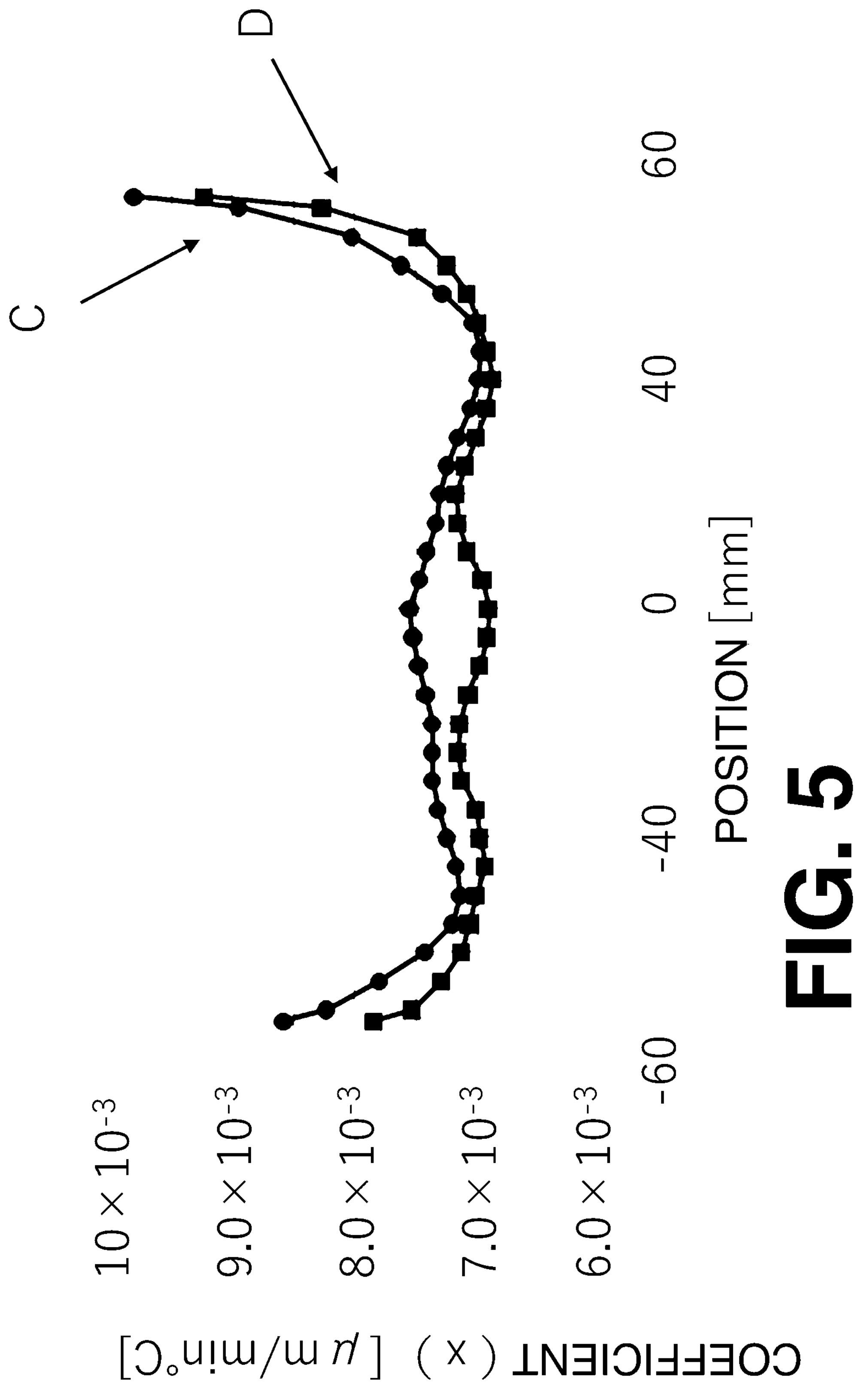
FIG. 5 is a graph illustrating a response function with respect to a distance from a center of a substrate.

FIG. 5 shows a graph plotting the positions of the measured slope of a straight line fitted by the least-squares method to the data at all the points where the growth rate was measured on the centerline of the circular substrate. Data C and D represent data for two different pieces of hardware.

In the above experimental example, the characteristic $Q(x, P_i)$ corresponds to the growth rate distribution, the process parameter $P_i$ corresponds to the growth temperature, the response function $F_{Qj}(x, \Delta P_k)$ corresponds to a linear function representing straight line B in the data shown in FIG. 4, and FIG. 5 is a graph showing the coefficients A(x) of the response function $F_{Qj}(x, \Delta P_k)$ versus position. The horizontal axis in FIG. 5 shows the distance from the origin in the positive and negative directions, using the central point on the diameter through the center of the wafer as the origin. The vertical axis in FIG. 5 shows the coefficient A(x) at the positions. The coefficient A(x) in FIG. 5 corresponds to the slope of the growth rate versus temperature, i.e., the sensitivity of the growth rate to the temperature.

When data C and D are compared to each other, the coefficient A(x) for each has a different value, indicating that different hardware changes the response function. The results in FIG. 5 also show that the sensitivity of the growth rate to the temperature increases as the position moves away from the center of the wafer. This indicates that the growth rate is sensitive to the variations in the growth temperature at a position away from the center of the wafer, and thus, for example, the response function can be used as an indicator in verifying hardware design changes.

Second Experimental Example

Next, the parameter determination method according to an example was used to derive the response function for the actual epitaxial deposition process and to compute the selected values of process parameters. The details thereof will be described below.

As in the first experimental example, actual epitaxial deposition was performed using the epitaxial growth system shown in FIGS. 1 and 2. The characteristic Q(x, P1, P2, P3) corresponds to the growth rate distribution, and process parameters $P_i$ are set such that $P_1$: opening degree of gas inlet distribution mechanism portion with fixed gas flow rate balance, $P_2$: flow rate of hydrogen as carrier gas, and $P_3$: gas In ratio (total opening degree fixed). The process parameter $P_1$, not shown in the drawings, is directed to the fixed In/Out ratio opening of the regulating valve that distributes the gas to the In and Out sides. The process parameter $P_2$ is directed to the flow rate of the carrier gas supplied from a gas supply source, not shown, connected to the gas inlet path 18 shown in FIG. 1, and is adjusted by a gas valve provided between the gas inlet path 18 and the gas supply source. The process parameter $P_3$ is directed to the ratio of the opening degree of the regulating valve that distributes the gas above to the In and Out sides.

Epitaxial deposition was performed by varying the process parameters $P_1$, $P_2$ and $P_3$ at three different levels. In detail, epitaxial deposition was performed by fixing two of the process parameters $P_1$, $P_2$, and $P_3$, and varying the remaining one process parameter at three levels. In this example, the number of epitaxial films to be obtained is nine since each process parameter has three patterns.

As in the first experimental example, the film thickness was measured at a plurality of points on the centerline of the circular substrate of the nine epitaxial films obtained, the growth rate was determined from the film thickness and growth time, and the amount of variation in the growth rate versus process parameters was examined. The results showed that for all the process parameters $P_1$, $P_2$, and $P_3$, the growth rate linearly varied with respect to the process parameters at all the positions where the growth rate was measured on the centerline of the circular substrate.

Figures 6A, 6B, 6C:
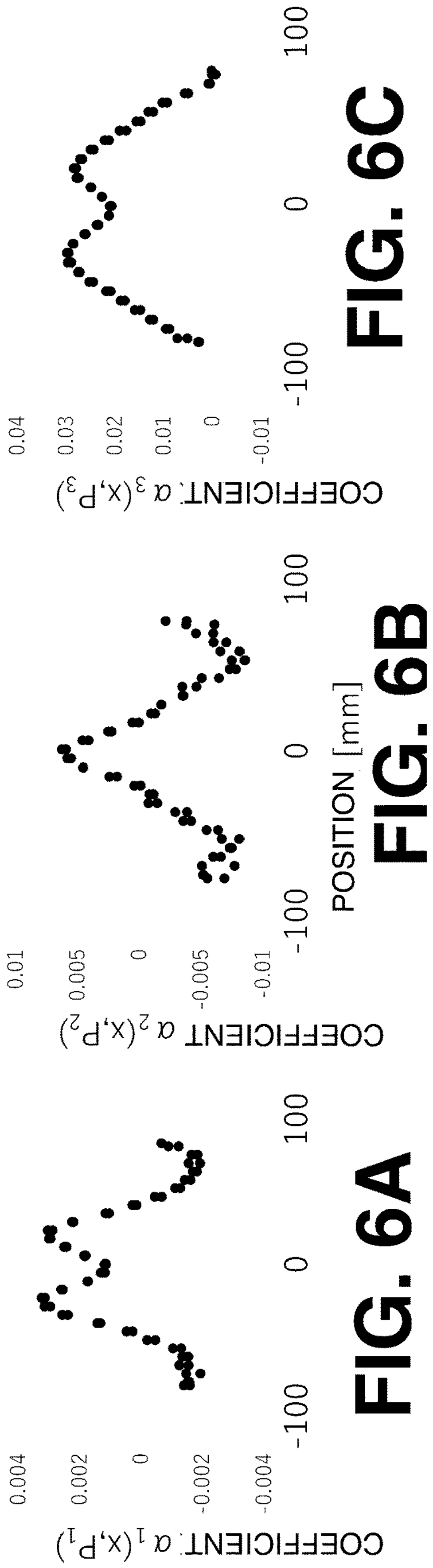
FIG. 6A to 6C show graphs illustrating the response function with respect to the distance from the center of the substrate where

In the same manner as in the graph shown in FIG. 4, a linear function obtained by plotting the process parameters with respect to the growth rate and fitting them with a straight line is set as a response function. FIG. 6A to 6C show plots of the coefficients of the response function with respect to the distance from the center on the centerline of the circular substrate of the epitaxial film for each of the process parameters $P_1$, $P_2$ and $P_3$. FIG. 6A is a graph for the process parameter $P_1$, FIG. 6B for the process parameter $P_2$, and FIG. 6C for the process parameter $P_3$.

Next, if the thickness of the epitaxial film at a distance x from the center on the centerline of the circular substrate before the process parameter is varied is set as $Tc(x, P_1, P_2, P_3)$, the thickness of the epitaxial film at a time when the process parameters $P_1$, $P_2$, $P_3$ are varied by $\Delta P_1$, $\Delta P_2$, $\Delta P_3$, respectively, is set as $To(x, P_1+\Delta P_1, P_2+\Delta P_2, P_3+\Delta P_3)$, and the coefficients of the respective response functions of the process parameters $P_1$, $P_2$, $P_3$ are set as $\alpha_i(x, P_i)$, $To(x, P_1+\Delta P_1, P_2+\Delta P_2, P_3+\Delta P_3)$ is expressed by equation (9):

$$T_o(x, P_1\,\Delta P_1, P_2+\Delta P_2, P_3+\Delta P_3) = T_c(x, P_1, P_2, P_3) + \alpha_1(x, P_1)\times\Delta P_1 + \alpha_2(x, P_2)\times\Delta P_2 + \alpha_3(x, P_3)\times\Delta P_3. \quad (9)$$

The simulation was performed such that the amount of variation in the film thickness expressed by the equation (5) was minimized over the range of measured x. The resulting process parameters are shown in Table 1.

TABLE 1

| | $P_1$ | $P_2$ | $P_3$ | Deviation |
|---|---|---|---|---|
| Before Variation | 45 | 76 | 60 | 3.52% |
| Variable Δ | −10 | −0.3 | 5.0 | |
| After Variation | 35 | 75.7 | 65.0 | 1.82% |

Figure 7:
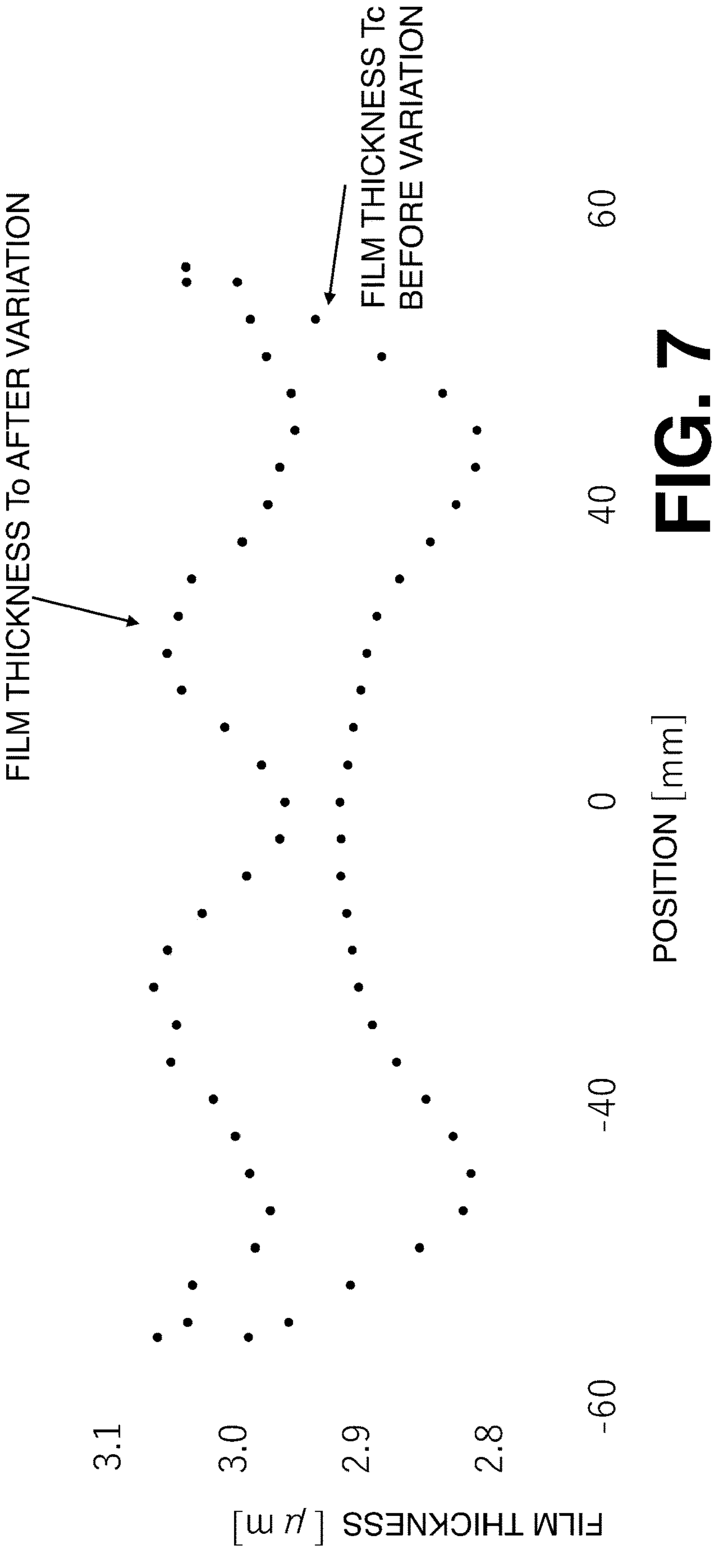
FIG. 7 is a graph illustrating the film thickness $T_c(x)$ and $T_o(x)$ with respect to the distance from the center of the substrate.

FIG. 7 shows film thickness $T_c(x, P_1, P_2, P_3)$, and $To(x, P_1+\Delta P_1, P_2+\Delta P_2, P_3+\Delta P_3)$, respectively. From Table 1 and FIG. 7, it can be recognized that after the process parameter is varied, the variation of the film thickness is reduced in comparison to that before the variation.

In the method described above, $\Delta P_1$, $\Delta P_2$, and $\Delta P_3$ were determined such that the amount of variation in the distribution of the film thickness was minimized. However, if the distribution of the film thickness includes the target distribution, $\Delta P_1$, $\Delta P_2$, and $\Delta P_3$ may be determined such that the difference between the distribution of the film thickness and the target distribution is minimized.

The response function is also sensitively changed depending on the hardware design changes and hardware-specific variations. As described below in the third example, obtaining the response functions for the process parameters by the above procedure is considered effective not only for the application to the condition adjustment algorithms but also for the verification of the effectiveness of the hardware design changes, for example, and for the verification of the differences among the devices.

Figure 8:
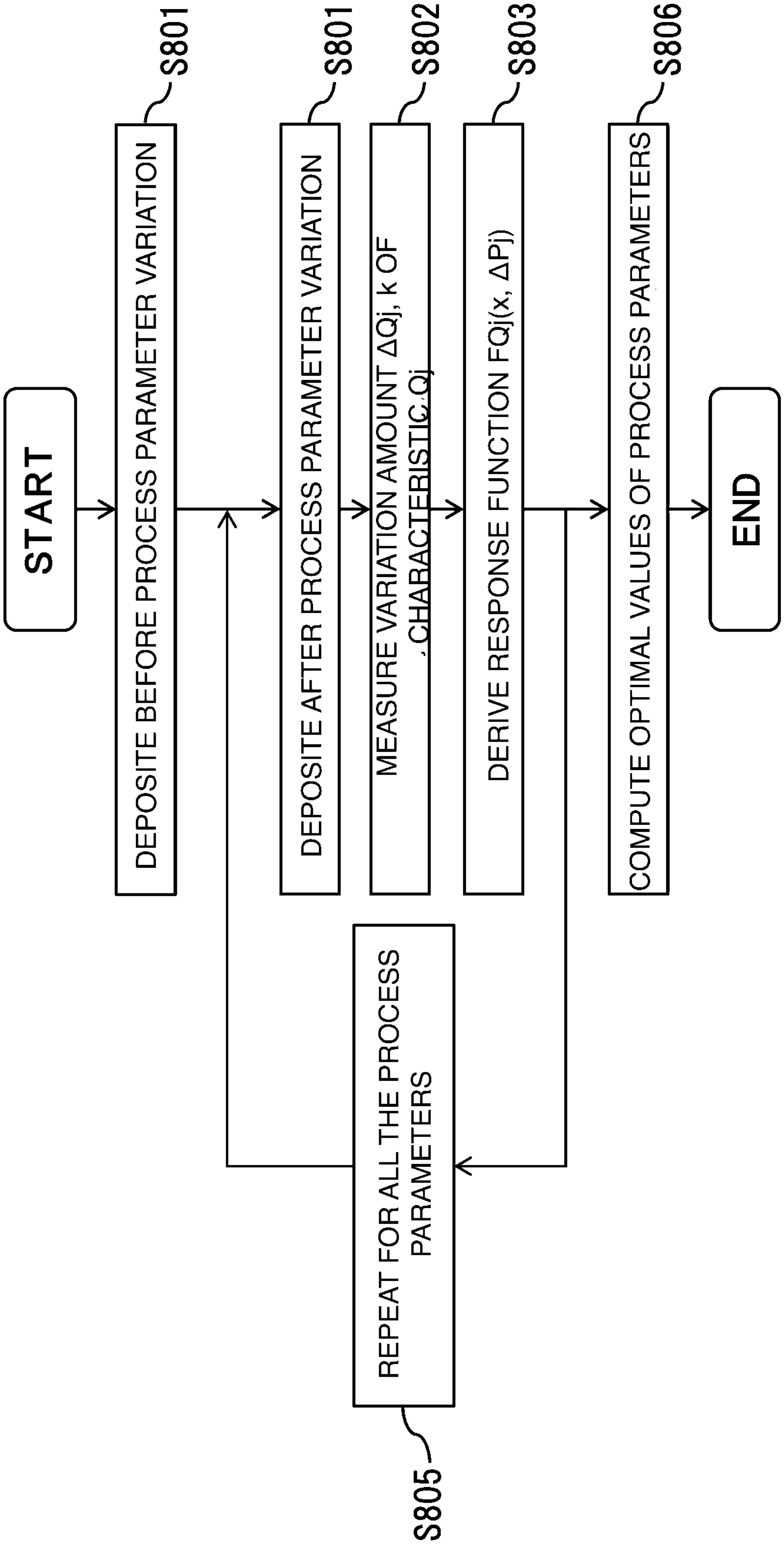
FIG. 8 is a flowchart for illustrating a parameter determination method according to the first example.

With reference to the flowchart in FIG. 8, the parameter determination method according to this example will be described. The method described below is used to compute the selected values of the process parameters $P_1, \ldots, P_M$ that minimize the deviation of the characteristics $Qj(x, P_M)$ of the epitaxial film from a desired constant or desired function within a predetermined range of a variable x at a time when the epitaxial film is grown on the substrate using the epitaxial growth system 1 shown in FIG. 1 and the characteristic measurement device for measuring the characteristics Qj(x, P1, . . . , PM), which is an example of the parameter determination method.

In step S801, the epitaxial film is deposited when the process parameters are directed to $P_1, \ldots, P_M$.

In step S802, the epitaxial film is deposited when the process parameter $P_k$ at i=k is varied by $\Delta P_k$ and the process parameter $P_i$ at i≠k among the process parameters $P_1, \ldots, P_M$ is not varied.

In step S803, the amount $\Delta Q_{j,\ k}$ of variation in the characteristic $Q_j$ of the deposited epitaxial film within a predetermined range of variable x is measured.

In step S804, the response function $F_{Qj}(x, \Delta P_k)$ is derived from equations (1) and (2) from the variation $\Delta Q_{j,\ k}$ of the characteristic $Q_j$ relative to the variation $\Delta P_k$ of the process parameter Pk:

$$Q_j(x, P_1, \ldots, P_M) = \sum_{i=1}^{M} f_{Q_j,i}(x, P_i). \tag{1}$$

$$\Delta Q_j(x, \Delta P_k) = Q_j(x, P_1, \ldots, P_k + \Delta P_k, \ldots, P_M) - Q_j(x, P_1, \ldots, P_M) \tag{2}$$

-continued $$= \sum_{i=1,i\neq k}^{M} f_{Q_j,i}(x, P_i) + f_{Q_j,k}(x, P_k + \Delta P_k) - \sum_{i=1}^{M} f_{Q_j,i}(x, P_i)$$

$$= f_{Q_j,k}(x, P_k + \Delta P_k) - f_{Q_j,k}(x, P_k) = F_{Q_j}(x, \Delta P_k).$$

In step S805, steps S802 through S804 for all the process parameters $P_1, \ldots, P_M$ are performed.

In step S806, the selected values of the process parameters $P_1, \ldots, P_M$ that minimize the deviation from the desired constant or desired function of the epitaxial film characteristics $Q_j(x, P_1, \ldots, P_M)$ are computed on the basis of the simulation.

Figure 9:
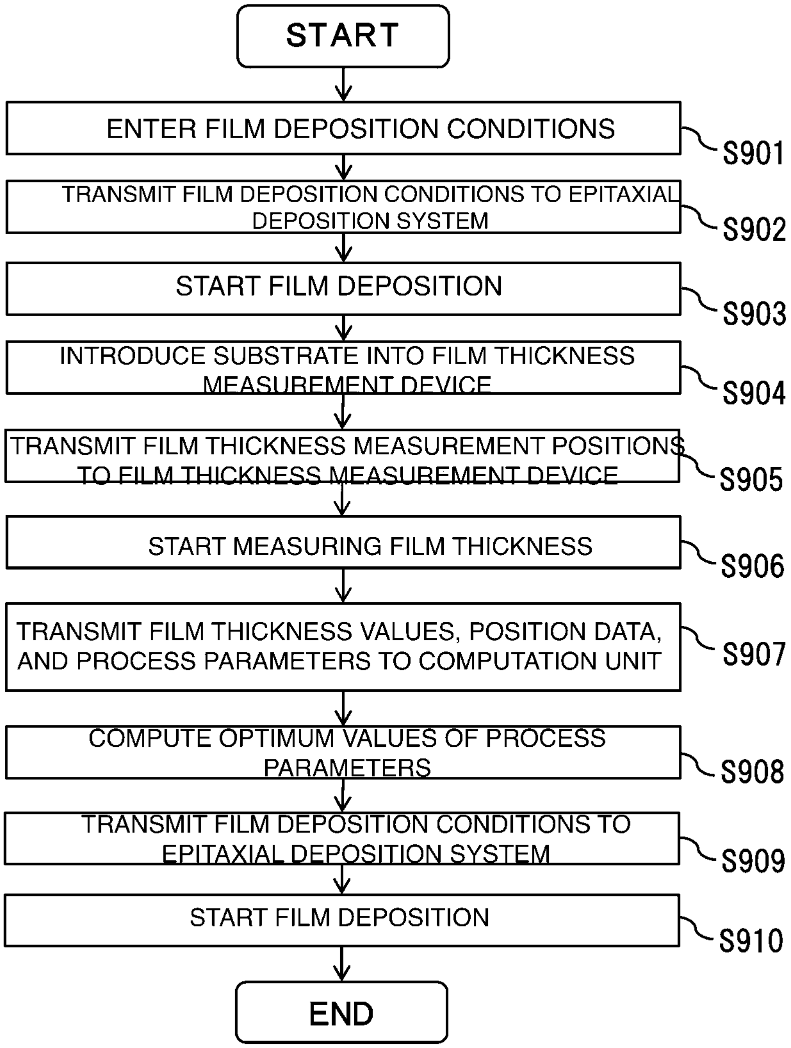
FIG. 9 is a flowchart for illustrating the parameter determination method according to the first example.

With reference to the flowchart in FIG. 9, an example of the operation of the parameter determination device will be described.

In step S901, after the substrate is introduced into the epitaxial growth system 1, the values of process parameters and other conditions for the deposition of epitaxial films are accepted by the input unit 309.

In step S902, the growth system controller 306 transmits the entered process parameter values and other conditions to the epitaxial growth system 1 via the I/O 305.

In step S903, the film deposition is started in the epitaxial growth system 1.

In step S904, after the film deposition is executed, the substrate with the epitaxial film deposited on the top surface thereof is introduced into the film thickness measurement device.

In step S905, the film thickness device controller 307 transmits the positions at which the film thickness is measured, which are entered through the input unit 309, to the film thickness measurement device via the I/O 305.

In step S906, film thickness measurement starts in the film thickness measurement device.

In step S907, the film thickness device controller 307 acquires from the film thickness measurement device the film thickness value obtained by the measurement and the position data on the substrate corresponding to the film thickness value, and transmits the film thickness value and position data to the computation unit 308. Further, the growth system controller 306 transmits the values of the process parameters at this time to the computation unit 308.

In step S908, the computation unit 308 uses the values of the film thickness, position data, and values of the process parameters to compute the selected values for the process parameters.

In step S909, the growth system controller 306 transmits the computed selected values of process parameters to the epitaxial growth system 1.

In step S910, the deposition of the epitaxial film is started.

Second Example

In the first example, the parameter determination device computed the selected values of the process parameters at the start of the deposition of the epitaxial film. The parameter determination device according to the first example was applied, for example, to the computation of the selected values of the process parameters, which is performed after maintenance.

However, even during the process of generating the epitaxial films, the conditions inside the epitaxial growth system gradually change. The characteristic distribution of the created epitaxial film changes as the conditions inside the epitaxial growth system change, and at a certain point, the amount of variation in the characteristic distribution may deviate from a predetermined range. The parameter determination device according to this example computes new selected values of the process parameters if the amount of variation of the characteristic distribution of the deposited epitaxial film deviates from the predetermined range.

Figure 10:
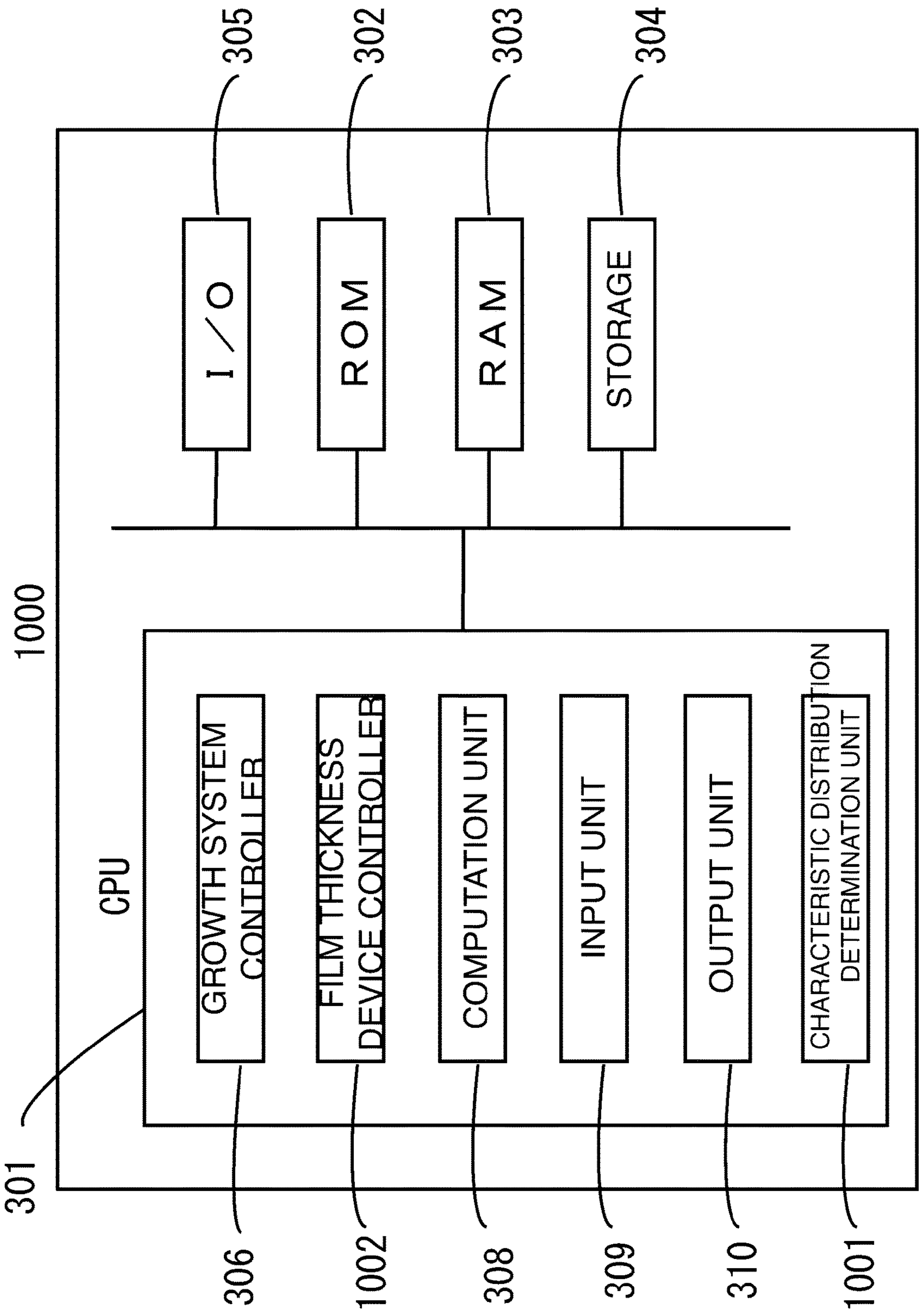
FIG. 10 is a block diagram illustrating a configuration of a control device of the parameter determination device according to a second example.

FIG. 10 is a block diagram illustrating a configuration of the computation device 1000. In comparison to the parameter determination device according to the first example, the parameter determination device according to this example includes a computation device 1000 in place of the computation device 27 shown in FIG. 3. The computation device 1000 is the same as the computation device 27 shown in FIG. 3, but further includes a characteristic distribution determination unit 1001, and film thickness device controller 1002.

In this example, the film thickness measurement device is connected to the computation device 1000, and configured to be controlled by the computation device 1000, for example, in removal of the wafer after deposition from the epitaxial growth system 1 and film thickness measurement in the film thickness measurement device.

The film thickness device controller 1002 transmits the conditions for film thickness measurement entered through the input unit 309 to the film thickness measurement device via the I/O 305. The film thickness value obtained by the measurement and the data of the position on the substrate corresponding to the film thickness value are acquired from the film thickness measurement device.

Once the selected values of the process parameters are computed by the computation unit 308, deposition of the epitaxial film is started on the basis of the computed selected values of the process parameters. For each wafer deposition completed, the characteristic distribution of the completed epitaxial film is measured. The characteristic distribution determination unit 1001 receives the data of the characteristic distribution measured as described above and determines whether the amount of variation of the characteristic distribution deviates from within the predetermined range.

If the amount of variation of the characteristic distribution does not deviate from the predetermined range, the characteristic distribution determination unit 1001 continues the deposition of the epitaxial films. In contrast, if the amount deviates, the parameter determination unit computes new selected values for the process parameters, and the computed new selected values are reflected on the deposition of the next single film.

The procedure for computing the new selected values for the process parameters may be the same as the procedure described in the first example, or, for example, the procedure such that when the characteristic distribution determination unit 1001 reveals that the amount of variation in the characteristic distribution deviates from the predetermined range, the process parameters are adjusted, the response function is derived using the data before and after the adjustment of the process parameters, and new selected values of the process parameters are computed. The latter procedure has the advantage that the parameters can be adjusted in real time, resulting in less loss of time and efforts.

Third Example

In the first and second examples, the characteristic $Q_j$ is a function of the variable x and the process parameters $P_1, \ldots, P_M$, and the response function $F_{Qj,i}(x, P_i)$ is derived to compute the selected values of the process parameters. In this example, the characteristic $Q_j$ is a function of the variable x and not the process parameters but the hardware design parameters that determine the hardware characteristics.

Hardware design parameters may correspond to design values that characterize, for example, heating system design, susceptor design, and chamber, and be different from the design values that characterize the designs on the basis of the purposes and methods, for example, in accordance with the design concept.

Examples of hardware design parameters and characteristic $Q_j$ may include the height of the pocket in the susceptor design, the distance between the pocket wall and the wafer edge, and the film thickness at the wafer edge. It has been reported that the film thickness at the wafer edge varies depending on the height H of the susceptor pocket and the distance W between the pocket wall and the wafer edge (see Japanese Registered Patent No. 4868522). The height H of the susceptor pocket and the distance W between the pocket wall and the wafer edge are set as the hardware design parameters, and the film thickness at the wafer edge is set as the characteristic $Q_j$. In the same manner as in the method described in the first example, the selected values for the height H of the susceptor pocket and the distance W between the pocket wall and the wafer edge can be computed to cause the film thickness at the wafer edge close to the desired value.

Figure 11:
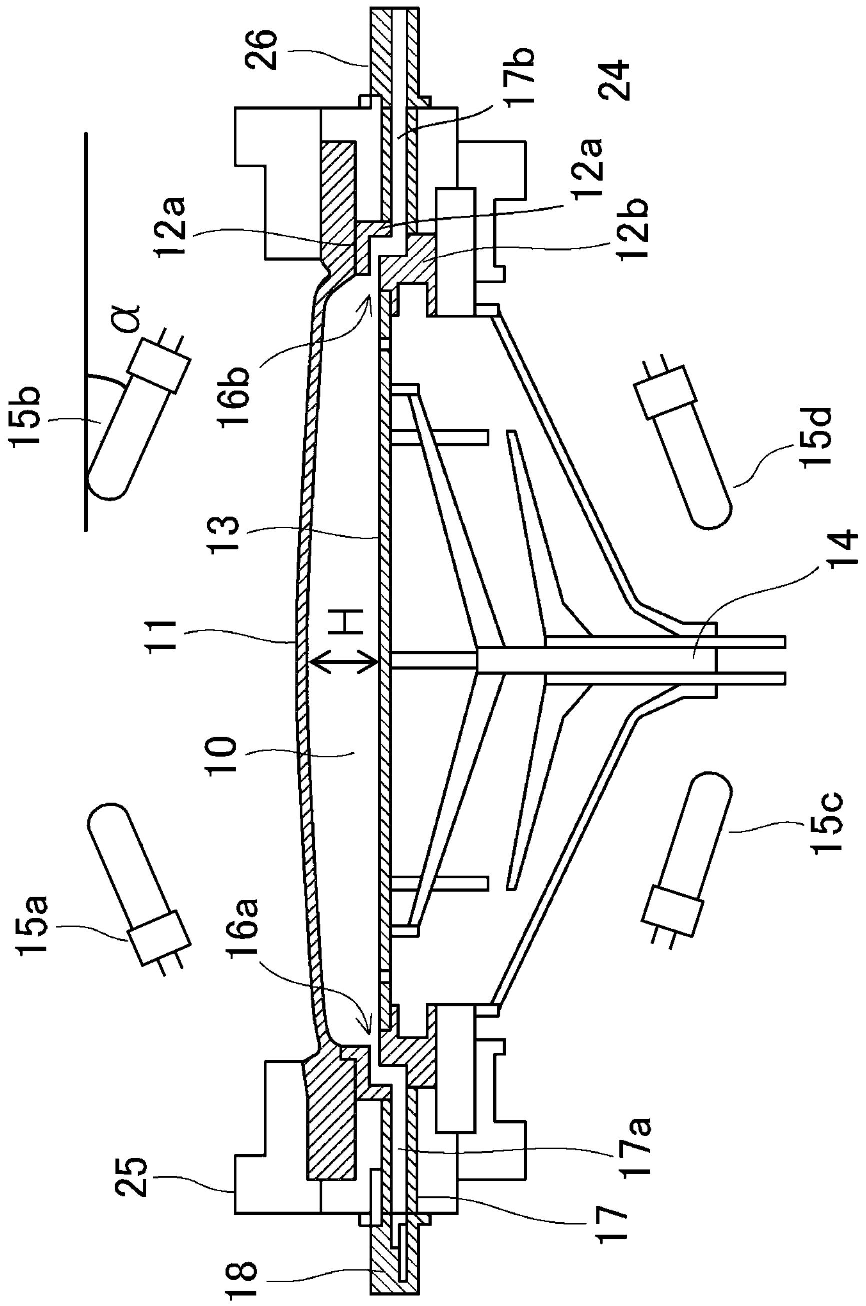
FIG. 11 is a schematic diagram illustrating an example of an epitaxial growth system according to a third example.

Another example of hardware design parameters and characteristic $Q_j$ may include the height of the space where the gas flow is formed in the epitaxial growth system and the thickness distribution of the epitaxial film. The height H of the space where the gas flow is formed is a hardware design parameter, and the thickness distribution of the epitaxial film is characteristic $Q_j$. The height H of the space where the gas flow is formed is the distance between the ceiling 11 and susceptor 13 inside the chamber 10 as shown in FIG. 11. In the same manner as in the method described in Example 1, the selected value of height H can be computed so that the spread of the thickness distribution of the epitaxial film is within the desired value.

Another example of hardware design parameters and characteristic $Q_j$ includes the inclination $\alpha$ of the reflector for the heating lamp in the epitaxial growth system and the thickness distribution of the epitaxial film. As shown in FIG. 11, the inclination $\alpha$ of the reflector for the heating lamp corresponds to the inclination of the heating means **15*a* to 15*d***. In this example, as in the example above, the selected value of the inclination $\alpha$ can be computed so that the spread of the thickness distribution of the epitaxial film is within the desired value.

The above disclosure may include various examples that are not described here. Therefore, the technical scope of this disclosure is defined only by the disclosure specific features recited in the appended claims which are reasonable from the above description.

The disclosure of Japanese Patent Application No. 2022-075038 filed on Apr. 28, 2022, including the specification, drawings and abstract is incorporated herein by reference in its entirety.

The invention claimed is:

1. A parameter determination device that computes a selected value for each of one or more parameters for an epitaxial growth system for depositing an epitaxial film on a substrate, the parameter determination device comprising:

a processor configured to:

accept a plurality of values for each of the one or more parameters, position data of the epitaxial film, and characteristic data measured by a characteristic measurement device for the epitaxial film deposited by the epitaxial growth system using the one or more parameters; and compute a selected value for each of the one or more parameters from the position data, the characteristic data, and the values for each of the one or more parameters, wherein the computation has equation (1) for a characteristic $Q_j$, where $Q_j$ is the characteristic data, x is the position, $P_i$ is the one or more parameters, and M is a total number of the one or more parameters, and 1≤I≤M:

$$Q_j(x, P_1, \dots, P_M) = \sum_{i=1}^{M} f_{Q_j,i}(x, P_i) \tag{1}$$

when a parameter $P_k$ at i=k is varied by $\Delta P_k$, and of the one or more parameters $P_1, \ldots, P_M$, the parameter $P_i$ at i≠k is not varied, an amount of variation $\Delta Q_{j,\ k}$ of the characteristic $Q_j$ is expressed by equation (2):

$$\begin{aligned} \Delta Q_j(x, \Delta P_k) &= Q_j(x, P_1, \dots, P_k + \Delta P_k, \dots, P_M) - Q_j(x, P_1, \dots, P_M) \\ &= \sum_{i=1, i\neq k}^{M} f_{Q_j,i}(x, P_i) + f_{Q_j,k}(x, P_k + \Delta P_k) - \sum_{i=1}^{M} f_{Q_j,i}(x, P_i) \\ &= f_{Q_j,k}(x, P_k + \Delta P_k) - f_{Q_j,k}(x, P_k) = F_{Q_j}(x, \Delta P_k) \end{aligned} \tag{2}$$

and a response function $F_{Qj}(x, \Delta P_k)$ is derived from the equations, and the derived response function $F_{Qj}(x, \Delta P_k)$ is used to compute by simulation a selected value of the one or more parameters, which minimizes a deviation from a desired constant or desired function of the characteristic within a predetermined range of the position; and a growth system controller configured to transmit the computed selected value for each of the one or more parameters to the epitaxial growth system to start deposition of the epitaxial film.

2. The parameter determination device according to claim 1, wherein the response function is a linear function.

3. The parameter determination device according to claim 1, wherein the characteristic is one of: film thickness, growth rate, specific resistance value, flatness, edge flatness, backside deposition thickness, roughness, and Haze of the epitaxial film.

4. The parameter determination device according to claim 1, wherein the parameter is a process parameter and is at least one of: gas flow rate of carrier gas or silicon source gas, wafer temperature, lamp heating balance, gas flow rate balance, susceptor rotation speed, and susceptor height.

5. The parameter determination device according to claim 1, wherein the position is one of: distance from a center point of the substrate, distance from an edge of a disk-shaped substrate, circumferential angle of the disk-shaped substrate, or a combination thereof.

6. The parameter determination device according to claim 1, wherein the parameter is a hardware design parameter, which is a height of a pocket in a susceptor design and a distance between a pocket wall and a wafer edge, and the characteristic is a film thickness at the wafer edge.

7. The parameter determination device according to claim 1, wherein the parameter is a hardware design parameter, which is a height of space where a gas flow is formed in the epitaxial growth system, and the characteristic is a thickness of the epitaxial film.

8. The parameter determination device according to claim 1, wherein the parameter is a hardware design parameter, which is a slope of a reflector for a heating lamp, and the characteristic is a thickness of the epitaxial film.

9. The parameter determination device according to claim 1, further comprising:

wherein the growth system controller is further configured to transmit a plurality of values for each of the one or more parameters to the epitaxial growth system; and a characteristic measurement device controller that transmits the position data of the epitaxial film to the characteristic measurement device and receives the characteristic data of the epitaxial film from the characteristic measurement device;

wherein the processor is further configured to determine whether the characteristic data deviates from within a predetermined range, and wherein if the characteristic data deviates from within the predetermined range, a selected value of each of the one or more parameters is computed again.

10. A parameter determination method of computing a selected value for each of one or more parameters for an epitaxial growth system for depositing an epitaxial film on a substrate, the method comprising:

accepting a plurality of values for each of the one or more parameters, position data of the epitaxial film, and characteristic data measured by a characteristic measurement device for the epitaxial film deposited by the epitaxial growth system using the one or more parameters;

deriving a response function $F_{Qj}(x, \Delta P_k)$ from equations (1) and (2), wherein if characteristic data obtained by measuring the characteristic is $Q_j$, the position is x, the one or more parameters is $P_i$, and a total number of the one or more parameters is M, and 1≤i≤M, the characteristic $Q_j$ is expressed by equation (1):

$$Q_j(x, P_1, \dots, P_M) = \sum_{i=1}^{M} f_{Q_j,i}(x, P_i) \tag{1}$$

when a parameter $P_k$ at i=k is varied by $\Delta P_k$, and of the one or more parameters $P_1, \ldots, P_M$, the parameter $P_i$ at i≠k is not varied, an amount of variation $\Delta Q_{j,\ k}$ of the characteristic $Q_j$ is expressed by equation (2):

$$\begin{aligned} \Delta Q_j(x, \Delta P_k) &= Q_j(x, P_1, \dots, P_k + \Delta P_k, \dots, P_M) - Q_j(x, P_1, \dots, P_M) \\ &= \sum_{i=1, i\neq k}^{M} f_{Q_j,i}(x, P_i) + f_{Q_j,k}(x, P_k + \Delta P_k) - \sum_{i=1}^{M} f_{Q_j,i}(x, P_i) \\ &= f_{Q_j,k}(x, P_k + \Delta P_k) - f_{Q_j,k}(x, P_k) = F_{Q_j}(x, \Delta P_k) \end{aligned} \tag{2}$$

computing by simulation a selected value of the one or more parameters, which minimizes a deviation from a desired constant or desired function of the characteristic within a predetermined range of the position using the derived response function $F_{Qj}(x, \Delta P_k)$; and transmitting the computed selected value for each of the one or more parameters to the epitaxial growth system to start deposition of the epitaxial film.

11. A non-transitory computer readable medium storing therein a parameter determination program for computing a selected value for each of one or more parameters for an epitaxial growth system for depositing an epitaxial film on a substrate, the program configured to cause a processor to perform a method comprising:

accepting a plurality of values for each of the one or more parameters, position data of the epitaxial film, and characteristic data measured by a characteristic measurement device for the epitaxial film deposited by the epitaxial growth system using one or more parameters for depositing the epitaxial film; and deriving a response function $F_{Qj}$ (x, $\Delta P_k$) from equations (1) and (2), wherein, if characteristic data is $Q_j$, a position is x, the one or more parameters is $P_i$, and a total number of the one or more parameters is M, and 1≤i≤M, the characteristic $Q_j$ is expressed by equation (1):

$$Q_j(x, P_1, \ldots, P_M) = \sum_{i=1}^{M} f_{Q_j,i}(x, P_i) \quad (1)$$

when a parameter $P_k$ at i=k is varied by $\Delta P_k$, and of the one or more parameters $P_1, \ldots, P_M$, the parameter $P_i$ at i≠k is not varied, an amount of variation $\Delta Q_{j,k}$ of the characteristic $Q_j$ is expressed by equation (2):

$$\begin{aligned}\Delta Q_j(x, \Delta P_k) &= Q_j(x, P_1, \ldots, P_k + \Delta P_k, \ldots, P_M) - Q_j(x, P_1, \ldots, P_M) \\ &= \sum_{i=1, i\neq k}^{M} f_{Q_j,i}(x, P_i) + f_{Q_j,k}(x, P_k + \Delta P_k) - \sum_{i=1}^{M} f_{Q_j,i}(x, P_i) \\ &= f_{Q_j,k}(x, P_k + \Delta P_k) - f_{Q_j,k}(x, P_k) = F_{Q_j}(x, \Delta P_k)\end{aligned} \quad (2)$$

computing by simulation a selected value of the one or more parameters, which minimizes a deviation from a desired constant or desired function of the characteristic within a predetermined range of the position using the derived response function $F_{Qj}$ (x, $\Delta P_k$); and transmitting the computed selected value for each of the one or more parameters to the epitaxial growth system to start deposition of the epitaxial film.

* * * * *